United States Patent [15] 3,652,995

Amberg [45] Mar. 28, 1972

[54] INPUT CIRCUIT FOR A SIGNALLING SYSTEM WHICH CYCLICALLY SCANS A PLURALITY OF SIGNALLING STATIONS UNDER COUNTER CONTROL

[72] Inventor: Hans-Ulrich Amberg, Erlangen, Germany

[73] Assignee: Siemens Aktiengesellschaft, Berlin, Germany

[22] Filed: July 8, 1970

[21] Appl. No.: 53,227

[30] Foreign Application Priority Data

July 11, 1969 Germany ......................P 19 35 235.3

[52] U.S. Cl................................340/167, 340/163, 340/166

[51] Int. Cl.......................H04q 3/00, H04q 9/00 H04q 5/00;

[58] Field of Search.................................340/163, 166, 167

[56] References Cited

UNITED STATES PATENTS 3,126,528 3/1964 Constantine ...................340/166 C X

*Primary Examiner*—Harold I. Pitts

*Attorney*—Curt M. Avery, Arthur E. Wilfond, Herbert L. Lerner and Daniel J. Tick

[57] ABSTRACT

Each of a plurality of changeover switches is provided at a corresponding one of a plurality of signalling stations and has a first contact terminal connected to the positive polarity terminal of a DC voltage source and a second contact terminal connected to the negative polarity terminal of the DC voltage source. Each of the plurality of transistor circuits is provided at a corresponding one of the signalling stations. Each transistor circuit comprises a PNP type transistor and an NPN type transistor connected in parallel with each other and connected to the fixed terminal of the switch arm of the corresponding one of the changeover switches. Each transistor circuit is electrically connected to a bus bar for applying a potential between the potentials of the terminals of the DC voltage source via the control winding of the corresponding one of the magnetic cores. Each transistor of each transistor circuit has a base electrode coupled to a counter via a decoder. The counter is controlled by a pulse generator.

5 Claims, 1 Drawing Figure

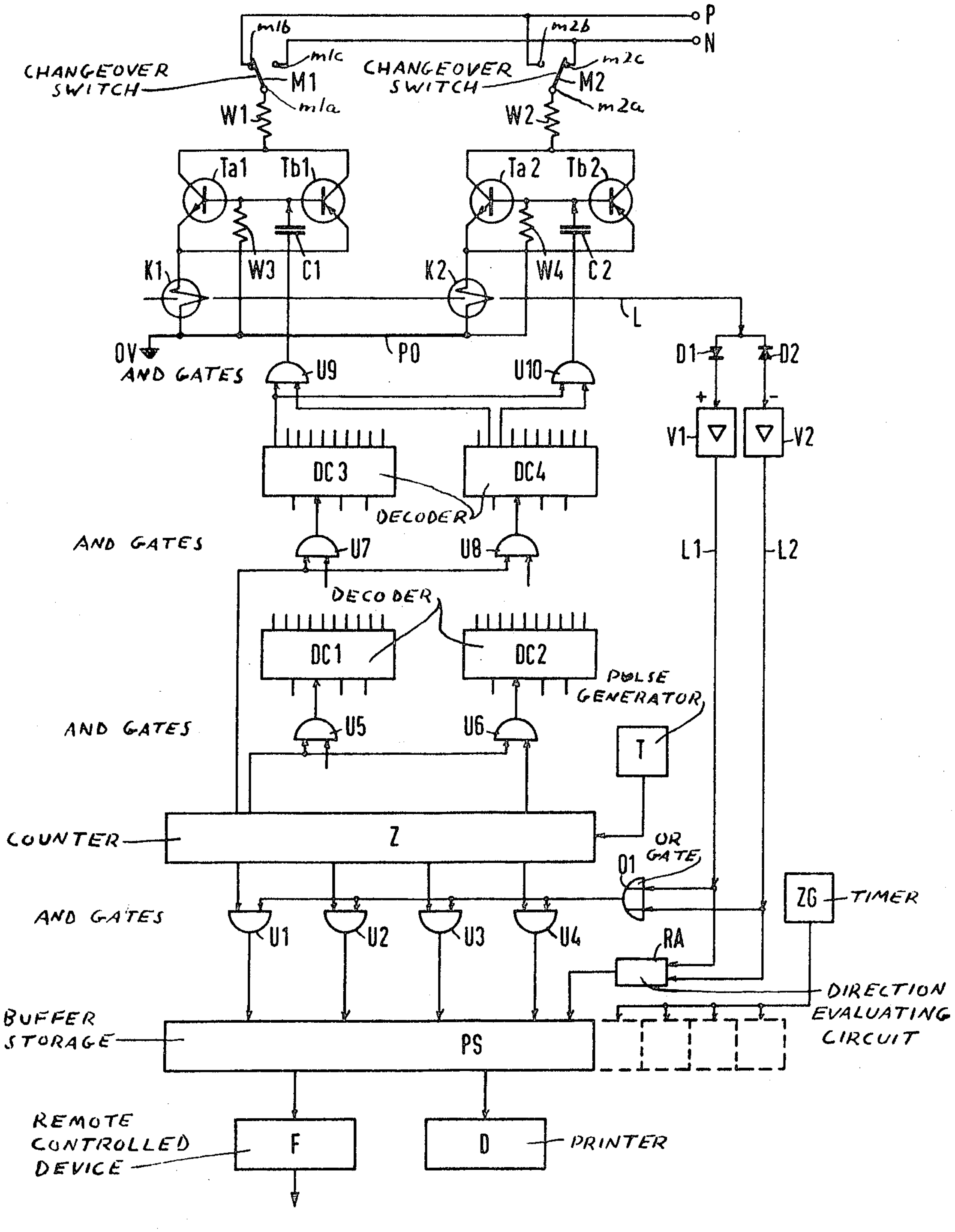
P
N
m1b
m1c
m2b
m2c
CHANGEOVER SWITCH
M1
m1a
CHANGEOVER SWITCH
M2
m2a
W1
W2
Ta1
Tb1
Ta2
Tb2
K1
W3
C1
K2
W4
C2
L
0V
PO
D1
D2
AND GATES
U9
U10
+
-
V1
V2
DC3
DC4
DECODER
AND GATES
U7
U8
L1
L2
DECODER
DC1
DC2
PULSE GENERATOR
AND GATES
U5
U6
T
COUNTER
Z
OR GATE
01
ZG
TIMER
AND GATES
U1
U2
U3
U4
RA
DIRECTION EVALUATING CIRCUIT
BUFFER STORAGE
PS
REMOTE CONTROLLED DEVICE
F
D
PRINTER

INPUT CIRCUIT FOR A SIGNALLING SYSTEM WHICH CYCLICALLY SCANS A PLURALITY OF SIGNALLING STATIONS UNDER COUNTER CONTROL

DESCRIPTION OF THE INVENTION

The invention relates to a signalling system which cyclically scans a plurality of signalling stations. More particularly, the invention relates to an input circuit for a signalling system which cyclically scans a plurality of signalling stations.

The monitoring of extensive systems such as, for example, those of large industrial enterprises, in power plants, and the like, makes it necessary to include greater numbers of recording or signalling stations in a system. In order to recognize disturbances rapidly, it is necessary that not only the signals received be known, but that the sequence of signals be known.

Known signalling systems utilize a printer which prints the signals in the sequence in which they are received. In order to print the signals in the proper sequence, when such signals are received in rapid succession, the known systems utilize a buffer storage connected in series with the signal printer. The messages are read into the buffer storage immediately after they are received. In order to determine whether or not a signal has been received at one of the signal stations of the signal system, that is, to determine whether the position of a signal circuit contact has changed, a counter is connected in series with the buffer storage and is continuously stepped by a pulse generator. An input circuit having a signal storage is connected to each signal circuit contact to permit scanning of a specific signal storage at any condition of the counter.

In a known signal system of the aforedescribed type, as disclosed, for example, in the periodical "Die Elektrische Ausruestung," 1964, Issue 6, pages 206 to 212, magnetic cores having rectangular characteristics are included in an input circuit for each signal station. The magnetic cores are tested during each scanning, sensing, reading, or the like, to determine whether a signal has been stored therein. In such case, as in other known magnetic core storages, a magnetic core is set during each change of condition. That is, the magnetic core is remagnetized in a specific direction, and during the scanning thereof, said core is tested to determine whether or not a signal is stored therein.

The principal object of the invention is to provide a new and improved input circuit for a signalling system which cyclically scans a plurality of signalling stations.

An object of the invention is to provide an input circuit for a signalling system which cyclically scans a plurality of signalling stations, which circuit overcomes the disadvantages of known similar types of circuit.

An object of the invention is to provide an input circuit for a signalling system which cyclically scans a plurality of signalling stations, which circuit is of simple structure and utilizes considerably less components for the storing and readout of signals in the magnetic cores.

An object of the invention is to provide an input circuit for a signalling system which cyclically scans a plurality of signalling stations, which circuit utilizes magnetic cores which are not set when signals are received and in which the signals are not destroyed during scanning.

An object of the invention is to provide an input circuit for a signalling system which cyclically scans a plurality of signalling stations, which circuit utilizes changeover switches for signal storage, and wherein reversal of magnetic cores is controlled during scanning in accordance with the switch position of the changeover switches.

In accordance with the invention, an input circuit for a signalling system which cyclically scans a plurality of signalling stations under the control of a pulse generator via a counter, each of the signalling stations having a magnetic core having a control winding and a rectangular magnetizing characteristic for storing received signals, comprises a DC voltage source having a positive polarity terminal and a negative polarity terminal. Each of a plurality of changeover switches is at a corresponding one of the signalling stations and each has a switch arm having a fixed electrical terminal at one end thereof, a first contact terminal electrically connected to the positive polarity terminal of the DC bus source and a second contact terminal electrically connected to the negative polarity terminal of the DC voltage source. A bus bar applies a potential between the potentials of the terminals of the DC voltage source. A counter has an input and outputs. A pulse generator is connected to the input of the counter and controls the operation of the counter. Decoding means has inputs coupled to the outputs of the counter and outputs. Each of a plurality of transistor circuits is at a corresponding one of the signalling stations. Each of the transistor circuits comprises a PNP type transistor and an NPN type transistor connected in parallel with each other and connected to the fixed terminal of the switch arm of the corresponding one of the changeover switches. Each of the transistor circuits is electrically connected to the bus bar via the control winding of the corresponding one of the magnetic cores. Each of the transistors of each of the transistor circuits has a base electrode connected to that of the other of the transistors and coupled to an output of the decoding means.

Each of the transistors of each of the transistor circuits has a collector electrode connected to that of the other of the transistors and coupled to the fixed terminal of the switch arm of the corresponding one of the changeover switches.

Each of the transistors of each of the transistor circuits has an emitter electrode connected to that of the other of the transistors and connected to the bus bar via the control winding of the corresponding one of the magnetic cores.

Each of the transistor circuits further comprises a capacitor coupled between an output of the decoding means and the base electrodes of the transistors thereof.

A common sensing lead is connected in common to the magnetic cores. A pair of leads branch from the common sensing lead. Each of a pair of diodes is connected with a different polarity in a corresponding one of the branching leads thereby determining the direction of the signal and the direction of switching of a changeover switch.

In order that the invention may be readily carried into effect, it will now be described with reference to the accompanying drawing, wherein the single FIGURE is a circuit and a block diagram of an embodiment of the input circuit of the invention for a signalling system which cyclically scans a plurality of signal stations.

The input circuit of the FIGURE comprises two changeover switches M1 and M2. The changeover switch M1 has a fixed electrical terminal m1a at one end thereof and the changeover switch M2 has a fixed electrical terminal *m2a* at one end thereof. The changeover switch M1 has a first contact terminal *m1b* electrically connected to the positive polarity terminal P of a DC voltage source. The changeover switch M2 has a first contact terminal *m2b* electrically connected to the positive polarity terminal P of the DC voltage source.

The changeover switch M1 has a second contact terminal m1c electrically connected to the negative polarity terminal N of the DC voltage source. The changeover switch M2 has a second contact terminal *m2c* electrically connected to the negative polarity terminal N of the DC voltage source. The changeover switch M1 has a switch arm *m1d* and the changeover switch M2 has a switch arm *m2d*. The fixed electrical terminal *m1a* of the changeover switch M1 is coupled to a bus bar PO at ground potential. The fixed electrical terminal *m2a* of the changeover switch M2 is coupled to the but bar PO.

The changeover switch M1 is coupled to the bus bar PO via a resistor W1, a transistor circuit T*a*1, T*b*1 and the control winding of a magnetic core K1. The changeover switch M2 is coupled to the bus bar PO via a resistor W2, a transistor circuit T*a*2, T*b*2 and the control winding of a magnetic core K2. The magnetic cores K1 and K2 have a readout, sensing or scanning lead L in common. The sensing lead L branches into two leads L1 and L2. The sensing lead is preferably a common one for all the magnetic cores.

The transistor circuit $Ta1$, $Tb1$ comprises a NPN type transistor $Ta1$ connected in parallel with a PNP type transistor $Tb1$. The base electrodes of the transistors $Ta1$ and $Tb1$ are connected to each other, the collector electrodes of said transistors are connected to each other and the emitter electrodes of said transistors are connected to each other. The resistor W1 is connected to a common point in the connection between the collector electrodes of the transistors $Ta1$ and $Tb1$. The control winding of the magnetic core K1 is connected to a common point in the connection between the emitter electrodes of the transistors $Ta1$ and $Tb1$.

The transistor circuit $Ta2$, $Tb2$ comprises a NPN transistor $Ta2$ connected in parallel with a PNP transistor Tb2. The base electrodes of the transistors $Ta2$ and $Tb2$ are connected to each other, the collector electrodes of said transistors are connected to each other and the emitter electrodes of said transistors are connected to each other. The resistor W2 is connected to a common point in the connection between the collector electrodes of the transistors $Ta2$ and $Tb2$. The control winding of the magnetic core K2 is connected to a common point in the connection between the emitter electrodes of the transistors $Ta2$ and $Tb2$. The bus bar PO is connected to a common point in the connection between the base electrodes of the transistors $Ta1$ and $Tb1$ via a resistor W3 and is connected to a common point in the connection between the base electrodes of the transistors $Ta2$ and $Tb2$ via a resistor W4.

A diode D1 is connected in the branch lead L1 and a diode D2 is connected in the branch lead L2. The diodes D1 and D2 are connected with different polarities, so that they provide different directions of conductivity. An amplifier V1 is connected in series with the diode D1 in the branch lead L1. An amplifier V2 is connected in series with the diode D2 in the branch lead L2. The branch lead L1 is connected to an input of an OR gate 01 and to an input of a direction evaluating circuit RA. The branch lead L2 is connected to the other input of the OR gate 01 and to the other input of the direction evaluating circuit RA.

The output of the OR gate 01 is connected to a first input of each of a plurality of AND gates U1, U2, U3 and U4. A counter Z has a plurality of outputs, each of which is connected to the second input of a corresponding one of the AND gates U1, U2, U3 and U4. The outputs of the AND gates U1, U2, U3 and U4 are connected to corresponding inputs of a buffer storage PS. A timer ZG has a plurality of outputs connected to corresponding inputs of the buffer storage PS. The buffer storage PS controls a printer D in a known manner, or transmits a signal to a remote controlled device F in known manner.

The counter Z is controlled or stepped by a pulse generator T connected to the input thereof. Each of the outputs of the counter Z, connected to the AND gates U1, U2, U3 and U4 represent a decade of said counter. The counter Z has a plurality of other outputs connected to corresponding inputs of a plurality of decoders DC1, DC2, DC3 and DC4 via corresponding AND gates U5, U6, U7 and U8. In order to maintain the clarity of illustration, only a few of the AND gates connected to the inputs of the decoders DC1, DC2, DC3 and DC4 are shown in the Figure.

A plurality of additional AND gates, of which only two, U9 and U10, are shown in the Figure, have their inputs connected to corresponding outputs of the decoders DC3 and DC4. The outputs of the additional AND gates are coupled to corresponding ones of the transistor circuits. Thus, the output of the AND gate U9 is coupled to the common base connection of the transistor circuit $Ta1$, $Tb1$ via a capacitor C1. The output of the AND gate U10 is coupled to the common base connection of the transistor circuit $Ta2$, $Tb2$ via a capacitor C2.

The decoders DC1, DC2, DC3 and DC4 are so connected that either an output of the decoders DC1 and DC2 or an output of the decoders DC3 and DC4 conducts the signal. In each case, only a single AND gate connected to the outputs of the decoders conducts an output signal, since an output signal is provided only for one AND gate, at a specific condition of the counter, at both inputs.

The additional AND gates U9 and U10 initiate the scanning of the changeover switches in the input circuits. The resistors W3 and W4 insure that the potential of the base electrodes of the transistors of each of the transistors circuits is normally the same as the potential of the bus bar PO. Thus, each transistor of each transistor circuit which is connected in series with a changeover switch is normally switched to its non-conductive condition, so that the current requirement is substantially zero, regardless of the number of signals supplied to the signalling system.

During each scanning cycle, the condition or position to the counter Z will instantaneously assume a magnitude at which the input requirements of the AND gate U9 are met. At such instant, an output signal is provided at the output of the AND gate U9. The output signal transferred by the AND gate U9 is converted into a pulse of a specific polarity by the capacitor C1. Thus, for example, the pulse provided by the capacitor C1 may be of positive polarity.

When the capacitor C1 provides a pulse of positive polarity, the transistor $Ta1$, which conducts current between the positive polarity terminal P of the DC voltage source and the bus bar PO, is switched to its conductive condition. When the changeover switch M1 is in its position illustrated in the Figure, a current flows through the transistor $Ta1$ and the control winding of the magnetic core K1. The current will or will not produce a magnetic reversal in the magnetic core K1 in accordance with whether or not the changeover switch M1 has changed its switching position during the next-preceding scanning cycle.

A change in switching position of the changeover switch M1 always results in the production of a pulse in the readout, sensing or scanning circuit. When the input signal is no longer provided and the AND gate U9 no longer transfers a signal, a negative pulse is provided at the common base connection of the transistors $Ta1$ and $Tb1$. The negative pulse attempts to switch the transistor $Tb1$ to its conductive condition. When the changeover switch M1 is in its switching position shown in the Figure, the transistor $Tb1$ is switched to its nonconductive condition and there is no current flow therethrough.

When the counter Z is in another condition or position, the AND gate U10 may be switched to its conductive condition, for example. When the AND gate U10 is in its conductive condition, a positive pulse is provided by the capacitor C2 to the base electrodes of the transistors $Ta2$ and $Tb2$. The positive pulse provided by the capacitor C2 attempts to switch the transistor $Ta2$ to its conductive condition. When the changeover switch M2 is in its switch position illustrated in the Figure, however, the transistor $Ta2$ is in its nonconductive condition.

When the AND gate U10 ceases to transfer an output signal, a negative pulse is supplied to the common base connection between the transistors $Ta2$ and $Tb2$. The negative pulse switches the transistor $Tb2$ to its conductive condition. When the transistor $Tb2$ is switched to its conductive condition, a current flows from the bus bar PO to the negative polarity terminal N of the DC voltage source via said transistor, the control winding of the magnetic core K2 and the changeover switch M2. Whether or not the current produces a pulse in the reading or sensing circuit L, again depends upon whether or not the switched position of the changeover switch M2 has changed since the next-preceding scanning cycle.

The different switching positions of the changeover switches M1 and M2 relative to each other produces current flows in different directions in the readout or sensing lead L, via the magnetic cores K1 and K2, if the switching position of said changeover switches has changed from those not shown in the Figure to those shown in the Figure. In order to utilize the pulse polarity, to indicate whether a signal has been received or destroyed, or whether a changeover switch whose position is being reported has been switched on or off, the diodes D1 and D2 in the branch leads L1 and L2, respectively, separate the polarity of the pulse. A pulse is supplied to one of the two inputs of the direction evaluating circuit RA in accordance with the polarity of the pulse in the readout or sensing circuit L. Thus, the direction of the change which has occurred is stored in the buffer storage PS with the signal number. The signal number is the same as the condition, position or count of the counter Z.

The known method of scanning of the input circuits is no longer utilized. That is, whether a specific magnetic core is remagnetized in a specific direction, is no longer determined. Instead, the direction of flow of the current, via the series-connected control winding of the magnetic core and the corresponding changeover switch, is determined. If the direction of current flow of the resultant current pulse is the same as during the next-preceding scanning cycle, there is no magnetic reversal of the corresponding magnetic core. If the direction of current flow changes, however, the magnetic core is magnetically reversed and produces a pulse of specific polarity in the sensing circuit L. The polarity of the pulse depends upon the direction of the change in position. The conductive condition of each of the AND gates U1, U2, U3 and U4 is controlled by the OR gate 01. This permits the supply of the signals to the buffer storage PS.

While the invention has been described by means of a specific example and in a specific embodiment, I do not wish to be limited thereto, for obvious modifications will occur to those skilled in the art without departing from the spirit and scope of the invention.

I claim:

1. An input circuit for a signalling system which cyclically scans a plurality of signalling stations under the control of a pulse generator via a counter, each of the signalling stations having a magnetic core having a control winding and a rectangular magnetizing characteristic for storing received signals, said input circuit comprising a DC voltage source having a positive polarity terminal and a negative polarity terminal;

a plurality of changeover switches each at a corresponding one of the signalling stations and each having a switch arm having a fixed electrical terminal at one end thereof, a first contact terminal electrically connected to the positive polarity terminal of said DC voltage source and a second contact terminal electrically connected to the negative polarity terminal of said DC voltage source;

a bus bar for applying a potential between the potentials of the terminals of said DC voltage source;

a counter having an input and outputs;

a pulse generator connected to the input of said counter and controlling the operation of said counter;

decoding means having inputs coupled to the outputs of said counter, said decoding means having outputs; and a plurality of transistor circuits each at a corresponding one of the signalling stations, each of said transistor circuits comprising a PNP type transistor and an NPN type transistor connected in parallel with each other and connected to the fixed terminal of the switch arm of the corresponding one of said changeover switches, each of said transistor circuits being electrically connected to said bus bar via the control winding of the corresponding one of said magnetic cores, each of the transistors of each of the transistor circuits having a base electrode connected to that of the other of the transistors and coupled to an output of said decoding means.

2. An output circuit as claimed in claim 1, wherein each of the transistors of each of the transistor circuits has a collector electrode connected to that of the other of the transistors and coupled to the fixed terminal of the switch arm of the corresponding one of said changeover switches.

3. An output circuit as claimed in claim 1, wherein each of the transistors of each of the transistor circuits has an emitter electrode connected to that of the other of the transistors and connected to said bus bar via the control winding of the corresponding one of said magnetic cores.

4. An output circuit as claimed in claim 1, wherein each of said transistor circuits further comprises a capacitor coupled between an output of said decoding means and the base electrodes of the transistors thereof.

5. An output circuit as claimed in claim 1, further comprising a common sensing lead connected in common to said magnetic cores, a pair of leads branching from said common sensing lead and a pair of diodes each connected with a different polarity in a corresponding one of the branching leads thereby determining the direction of the signal and the direction of switching of a changeover switch.

* * * * *